United States Patent
Horikawa

(10) Patent No.: US 11,339,942 B2
(45) Date of Patent: May 24, 2022

(54) VEHICLE LAMP

(71) Applicant: KOITO MANUFACTURING CO., LTD., Tokyo (JP)

(72) Inventor: Akihito Horikawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/289,905

(22) PCT Filed: Oct. 30, 2019

(86) PCT No.: PCT/JP2019/042582
§ 371 (c)(1),
(2) Date: Apr. 29, 2021

(87) PCT Pub. No.: WO2020/090888
PCT Pub. Date: May 7, 2020

(65) Prior Publication Data
US 2022/0003380 A1    Jan. 6, 2022

(30) Foreign Application Priority Data

Nov. 2, 2018 (JP) .............................. JP2018-207300
Mar. 14, 2019 (JP) .............................. JP2019-046966

(51) Int. Cl.
*F21S 43/239* (2018.01)
*F21S 43/31* (2018.01)
(Continued)

(52) U.S. Cl.
CPC ........... *F21S 43/239* (2018.01); *F21S 43/245* (2018.01); *F21S 43/249* (2018.01); *F21S 43/31* (2018.01); *G02B 6/0036* (2013.01)

(58) Field of Classification Search
CPC ........ F21S 43/239; F21S 43/31; F21S 43/245; F21S 43/249; G02B 6/0035; G02B 6/0036; G02B 6/0038; G02B 6/0068
See application file for complete search history.

(56) References Cited

U.S. PATENT DOCUMENTS

| | | | | |
|---|---|---|---|---|
| 4,965,950 A | * | 10/1990 | Yamada | B60Q 1/56 362/613 |
| 5,668,913 A | | 9/1997 | Tai et al. | |
| 6,164,799 A | | 12/2000 | Hirmer et al. | |
| 2008/0310187 A1 | * | 12/2008 | Huang | F21S 43/249 362/615 |

(Continued)

FOREIGN PATENT DOCUMENTS

| | | | | |
|---|---|---|---|---|
| DE | 10207694 A1 | * | 11/2003 | ........... B60Q 1/0058 |
| DE | 202016100986 U1 | * | 7/2017 | .............. F21S 43/14 |

(Continued)

OTHER PUBLICATIONS

International Search Report (PCT/ISA/210) dated Jan. 21, 2020 by the International Searching Authority in counterpart International Patent Application No. PCT/JP2019/042582.

(Continued)

*Primary Examiner* — Erin Kryukova
(74) *Attorney, Agent, or Firm* — Sughrue Mion, PLLC

(57) ABSTRACT

A vehicle lamp includes a light source and a plate-shaped light guide including a first plate surface on which a plurality of reflective elements are formed and a second plate surface. The plate-shaped light guide is configured to totally reflect light from the light source by the plurality of reflective elements. The plurality of reflective elements are arranged in a state of being continuously arranged along a line extending in a direction, and are arranged in a plurality of rows on the line. The plate-shaped light guide is configured to allow the light from the light source to reach a position of the line from (Continued)

a first direction. Each of the reflective elements has a substantially concave curved surface shape, and as compared to reflective elements constituting a first row, reflective elements constituting a second row is formed at a deeper position from the first plate surface.

7 Claims, 12 Drawing Sheets

(51) Int. Cl.
  *F21S 43/249* (2018.01)
  *F21S 43/245* (2018.01)
  *F21V 8/00* (2006.01)

(56) References Cited

U.S. PATENT DOCUMENTS

| | | | |
|---|---|---|---|
| 2009/0040789 A1 | 2/2009 | Maeda et al. | |
| 2013/0010486 A1 | 1/2013 | Natsume et al. | |
| 2014/0160778 A1* | 6/2014 | Nakada | B60Q 1/2607 362/511 |
| 2016/0231492 A1 | 8/2016 | Nakayama | |
| 2017/0234501 A1* | 8/2017 | Hanami | F21S 43/245 362/511 |

FOREIGN PATENT DOCUMENTS

| | | | |
|---|---|---|---|
| EP | 0933587 A2 * | 8/1999 | |
| EP | 1 000 296 A1 | 5/2000 | |
| EP | 1 015 811 A1 | 7/2000 | |
| EP | 1167870 A2 * | 1/2002 | F21S 48/215 |
| EP | 2 800 927 A1 | 11/2014 | |
| EP | 3 217 080 A1 | 9/2017 | |
| JP | 2000-206338 A | 7/2000 | |
| JP | 2013-16386 A | 1/2013 | |
| JP | 2016-143652 A | 8/2016 | |
| JP | 2017-92011 A | 5/2017 | |
| JP | 2017-112039 A | 6/2017 | |
| WO | 99/15827 A1 | 4/1999 | |

OTHER PUBLICATIONS

Search Report dated Nov. 8, 2021 by the European Patent office in counterpart European Patent Application No. 19879288.9.

* cited by examiner

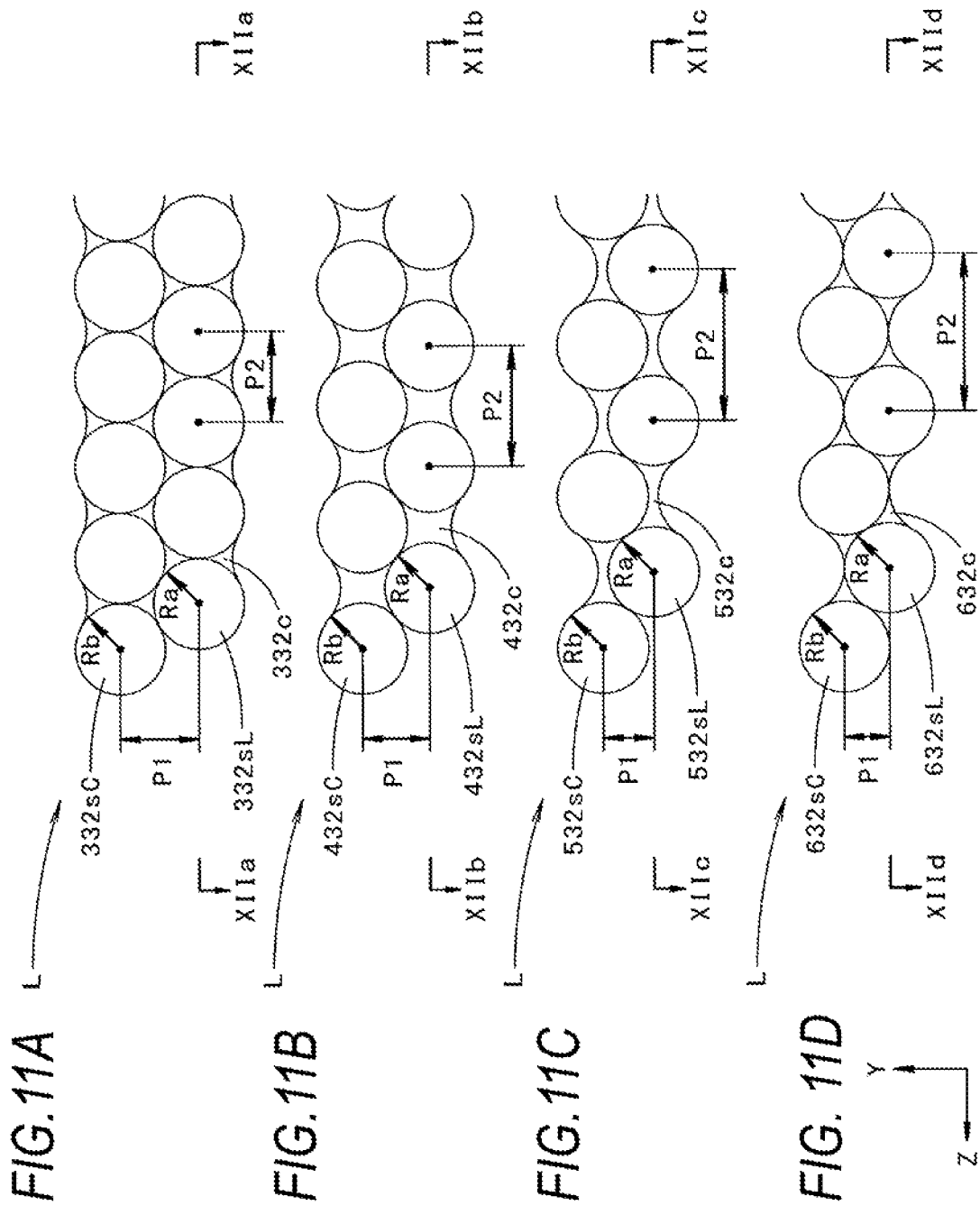

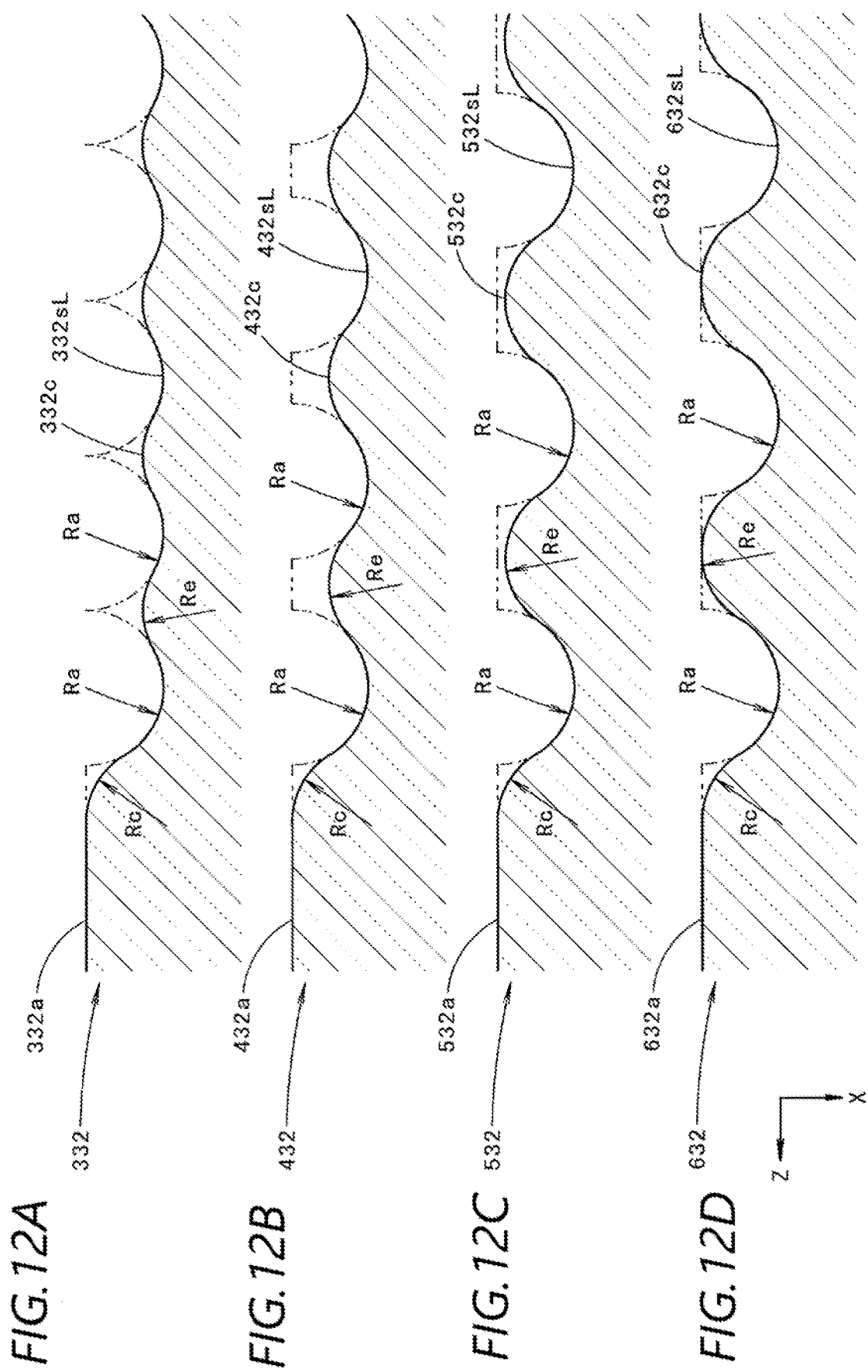

VEHICLE LAMP

TECHNICAL FIELD

In related art, a vehicle lamp configured to totally reflect light from a light source and incident on a plate-shaped light guide by a plurality of reflective elements formed on a first plate surface of the plate-shaped light guide and then emit the light from a second plate surface of the plate-shaped light guide toward a front side of the lamp is known.

Patent Literature 1 discloses, as such a vehicle lamp, a vehicle lamp configured to cause light emitted from a plurality of light sources disposed along a rear end surface of a plate-shaped light guide to be incident on a plate-shaped light guide from the rear end surface.

BACKGROUND ART

Citation List

Patent Literature

Patent Literature 1: JP-A-2013-16386

SUMMARY OF INVENTION

Technical Problem

By adopting the configuration described in Patent Literature 1, the plate-shapes light guide can appear to emit light in a manner substantially uniform in a front view of the lamp.

On the other hand, when a vehicle lamp includes a side light-emitting optical fiber the optical fiber appears to emit light linearly, which enhances design property when the lamp is turned on. However, it is not easy to realize a specific structure for causing the light emitted from the light source to be incident with respect to the optical fiber from an end surface of the optical fiber.

Regarding this, in a vehicle lamp including a plate-shaped light guide, it is possible to realize linear light emission by adopting a configuration in which a narrow groove-like reflective element is formed on a plate surface on a rear side of the lamp, a configuration in which a plurality of reflective elements are formed in a linear arrangement, or a configuration in which a plate surface on a front side of the lamp is textured as a configuration of the plate-shaped light guide.

However, in the former two configurations, a sight direction in which the plate-shaped light guide appears to emit light linearly is limited, while the latter one configuration cannot secure sufficient brightness. Therefore, it is not possible to realize a manner of light emission similar as an optical fiber, and thus it is not possible to improve design property when the lamp is turned on.

The present disclosure has been made in view of such circumstances, and it is an object of the present disclosure to provide a vehicle lamp including a plate-shaped light guide and capable of improving, design property when the lamp is turned on.

Solution to Problem

The present disclosure has been made in order to achieve the above object by modifying a configuration of a plate-shaped light guide.

That is, a vehicle lamp according to the present disclosure is:

a vehicle lamp including a light source and a plate-shaped light guide, in which the plate-shaped light guide is configured to totally reflect light from the light source and incident on the plate-shaped light guide by a plurality of reflective elements formed on a first plate surface of the plate-shaped light guide and then emit the light from a second plate surface of the plate-shaped light guide toward a front side of the lamp, the plurality of reflective elements are arranged in a state of being continuously arranged along a line extending in a required direction, and are arranged in a plurality of rows on the line so as to be adjacent to each other in a direction intersecting the required direction, the plate-shaped light guide is configured to allow the light from the light source and incident on the plate-shaped light guide to reach a position of the line from a first direction intersecting the required direction, and each of the reflective elements has a substantially concave curved surface shape, and as compared to reflective elements constituting a first row in the first direction that is closest to the first direction among the plurality of rows, reflective elements constituting a second row in the first direction that is adjacent to the first row in the first direction is formed at a deeper position from the first plate surface.

A type of the "light source" is not particularly limited. For example, a light emitting diode, an incandescent valve, and the like can be adopted.

A specific shape of the "plate-shaped light guide" is not particularly limited as long as the plate-shaped light guide is configured to totally reflect light from the light source and incident on the plate-shaped light guide by the plurality of reflective elements formed on the first plate surface and then emit the light from the second plate surf ace toward the front side of the lamp.

A specific direction of the "required direction" is not particularly limited.

A specific shape of the "substantially concave curved surface" is not particularly limited, and may be, for example, a substantially concave spherical surface shape, a substantially concave elliptical spherical surface shape, a substantially concave polyhedral shape, or the like. The concave curved surface referred to here indicates a curved surface shape in which the first plate surface of the plate-shaped light guide is concave when viewed from the outside, and a shape of a reflection surface thereof is a convex curved surface shape toward the inside of the plate-shaped light guide.

as long as the "reflective elements constituting the second row in the first direction" are formed at a position deeper from the first plate surface than the "reflective element constituting the first row in the first direction", a specific positional relationship therebetween is not particularly limited.

Advantageous Effects of Invention

The vehicle lamp according to the present disclosure is configured to totally reflect light from the light source and incident on the plate-shaped light guide by the plurality of reflective elements formed on the first plate surface and then emit the light from the second plate surface toward the front side of the lamp. Since the plurality of reflective elements are arranged continuously along the line extending in the required direction, the light from the light source and incident on the plate-shaped light guide is totally reflected by the reflective elements and emitted from the second plate surface toward the front side of the lamp, so that the plate-shaped light guide can appear to emit light linearly along the line.

At this time, since each reflective element has a substantially concave curved surface shape, the total reflection by the reflective elements is performed in a manner substantially uniform in all directions. Therefore, even when a sight direction for observing the plate-shaped light guide is greatly changed, it is possible to maintain a state in which the plate-shaped light guide appears to emit light linearly along the line. Therefore, the optical fiber can appear to emit light when the lamp is turned on (that is, when the light source is turned on), thereby improving the design property of the vehicle lamp.

In addition, since the plurality of reflective elements are arranged in the plurality of rows on the line so as to be adjacent to each other in the direction intersecting the required direction, and the plate-shaped light guide is configured to allow the light from the light source and incident on the plate-shaped light guide to reach a position of the line from a first direction intersecting the required direction, the plate-shaped light guide can appear to emit light linearly at a brightness that is even more uniform along the line.

In addition, since each of the reflective elements has the substantially concave curved surface shape, and as compared to the reflective elements constituting the first row in the first direction that is closest to the first direction among the plurality of rows, the reflective elements constituting the second row in the first direction that is adjacent to the first row in the first direction is formed at a deeper position front the first plate surface, brightness of the reflected light from the reflective elements constituting the second row in the first direction can approach brightness of the reflected light from the reflective elements constituting the first row in the first direction. Therefore, the plate-shaped light guide can appear to emit light linearly at a brightness that is even more uniform along the line.

As described above, according to the present disclosure, it is possible to improve the design property when the lamp is turned on in a vehicle lamp including a plate-shaped light guide.

In the above configuration, if a depth of the reflective elements constituting the second row in the first direction from the first plate surface is set to a value 1.5 times to 2.5 times a depth of the reflective elements constituting the first row in the first direction from the first plate surface, the brightness of the reflected light from the reflective elements constituting the second row in the first direction can easily approach the brightness of the reflected light from the reflective elements constituting the first row in the first direction.

In the above configuration, by further adopting a configuration including a second light source disposed to allow light to reach the plate-shaped light guide at the position of the line from a second direction that is a direction intersecting the required direction and is opposite to the first direction, and a configuration in which as compared to reflective elements constituting a first row in the second direction that is closest to the second direction among the plurality of rows, reflective elements constituting a second row in the second direction that is adjacent to the first row in the second direction is formed at a deeper position from the first plate surface, brightness of the reflected light from the reflective elements constituting the second row in the second direction can approach brightness of the reflected light from the reflective elements constituting the first row in the second direction.

In this case, if the second row in the first direction and the second row in the second direction are the same row, the plurality of reflective elements can appear to emit light in a manner substantially uniform in three rows on the line.

On the other hand, by adopting a configuration in which a third row is disposed between the second row in the first direction and the second row in the second direction, and a configuration in which as compared to the reflective elements constituting the second row in the first direction and the reflective elements constituting the second row in the second direction, reflective elements constituting the third row are formed at a deeper position from the first plate surface, the plurality of reflective elements can appear to emit light in a manner substantially uniform in five rows on the line.

In the above configuration, by further adopting a configuration in which the at least one line includes a plurality of lines arranged at an interval in a direction intersecting the required direction, the plurality of optical fibers can appear to emit light in a state of being discretely arranged when the lamp is turned on, thereby farther enhancing an effect of performance of the design.

In this case, in order to enhance the effect that a plurality of optical fibers appear to emit light in a state of being discretely arranged, it is preferable to set the interval between the lines in the required direction to a value larger than a width of the line.

In the above configuration, by further adopting a configuration in which a surface shape of each of the reflective elements is set to a concave spherical surface shape, and a configuration in which a pitch between a plurality of reflective elements constituting each of the rows is set to a value of 2 to 15 times a radius of the concave spherical surface constituting each of the reflective elements, the following effect can be obtained.

That is, in a case where reflective elements adjacent to each other in each row are arranged in a partially overlapping state, a connection portion thereof has a shape pointed in a ridge line shape due to an intersection line between the concave spherical surfaces. In fact when a metal mold for molding the plate-shaped light guide is processed, a corner curved surface (that is, a mold processing curved surface is inevitably formed in the connection portion, and thus, in the connection portion, a maximum inclination angle of an outer peripheral edge portion of each of the reflective elements is extremely small. Therefore, light is not totally reflected in the connection portion, and thus the brightness of the reflected light from each reflective element is lowered.

On the other hand, by adopting a configuration in which the pitch between the plurality of reflective elements constituting each row is set to a value 2 or more times the radius of the concave spherical surface, it is possible to prevent the maximum inclination angle of the outer peripheral edge portion of each reflective element from becoming extremely small at the connection portion due to the mold processing curved surface. As a result, it is possible to prevent the brightness of the reflected light from each reflective element from being lowered.

On the other hand, although the brightness of the reflected light from each reflective element increases as the pitch between the plurality of reflective elements constituting each of the rows increases, when the pitch exceeds 3.5 times the radius of the concave spherical surface, a flat surface portion is formed between the plurality of reflection elements constituting each column. As a result, an arrangement density of the plurality of reflective elements as an entity of the plurality of rows is reduced, and therefore, the effect of performance in the design that appears to emit light linearly along the line is reduced. Therefore, it is preferable that the pitch is set to a value no more than 3.5 times the radius of the concave spherical surface.

From this point of view, it is more preferable that the pitch between the plurality of reflective elements constituting each of the rows row is set to a value of 2.5 to 3 times the radius of the concave spherical surface constituting each of the reflective elements.

BRIEF DESCRIPTION OF DRAWINGS

FIG. 11A is a view taken in a direction of an arrow XIa of FIG. 10, and FIG. 11B to 11D are views similar to FIG. 11A, showing fourth to sixth modifications of the embodiment.

FIG. 12A is a cross-sectional view taken along line XIIa-XIIa in FIG. 11, FIG. 12B is a cross-sectional view taken along line XIIb-XIIb in FIG. 11, FIG. 12C is a cross-sectional view taken along line XIIc-XIIc in FIG. 11, and FIG. 12D is a cross-sectional view taken along line XIId-XIId in FIG. 11.

DESCRIPTION OF EMBODIMENTS

Hereinafter, embodiments of the present disclosure will lye described with reference to the drawings.

Figure 1:
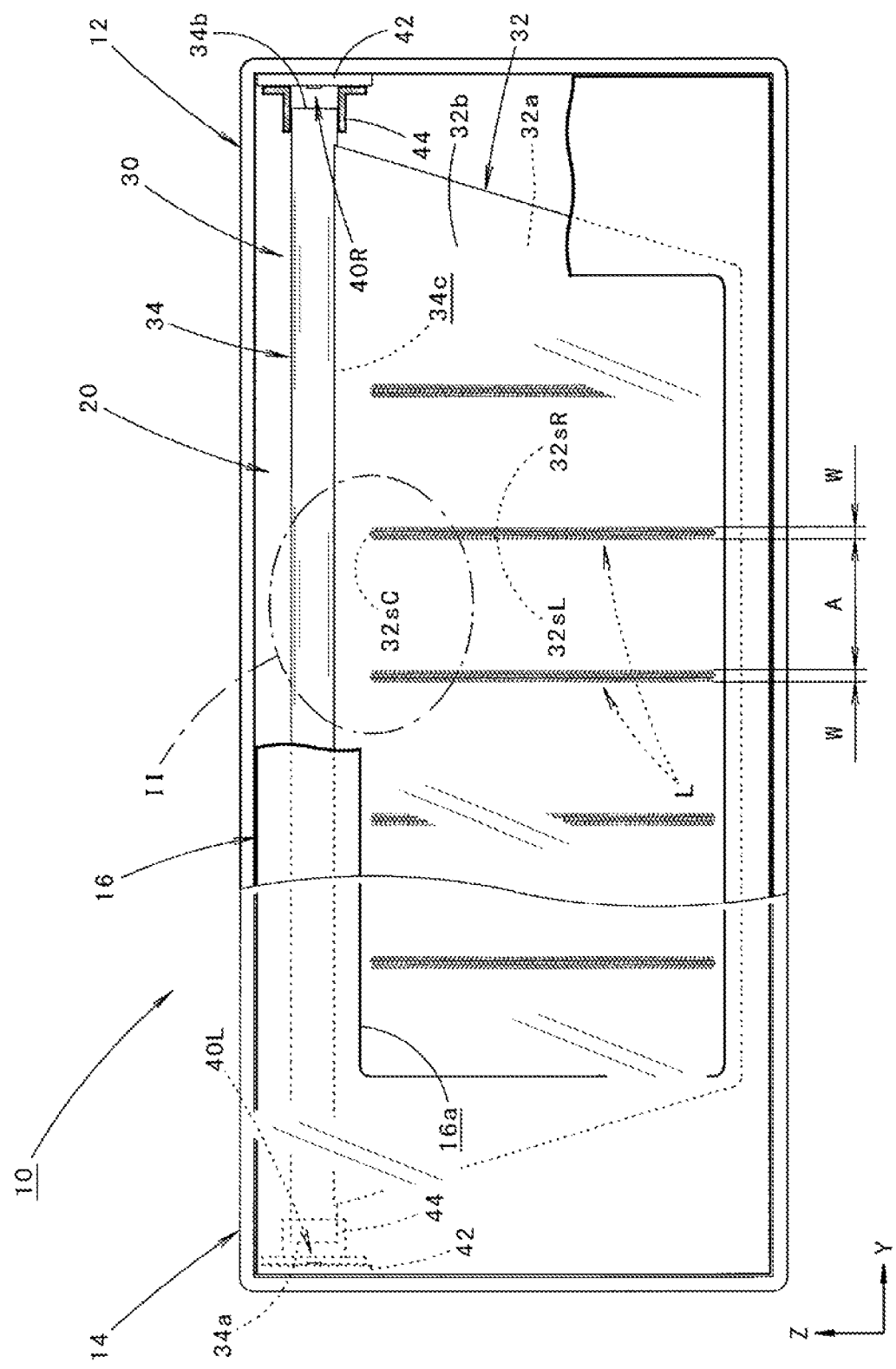
FIG. 1 is a front view illustrating a vehicle lamp according to an embodiment of the present disclosure.
Figure 2:
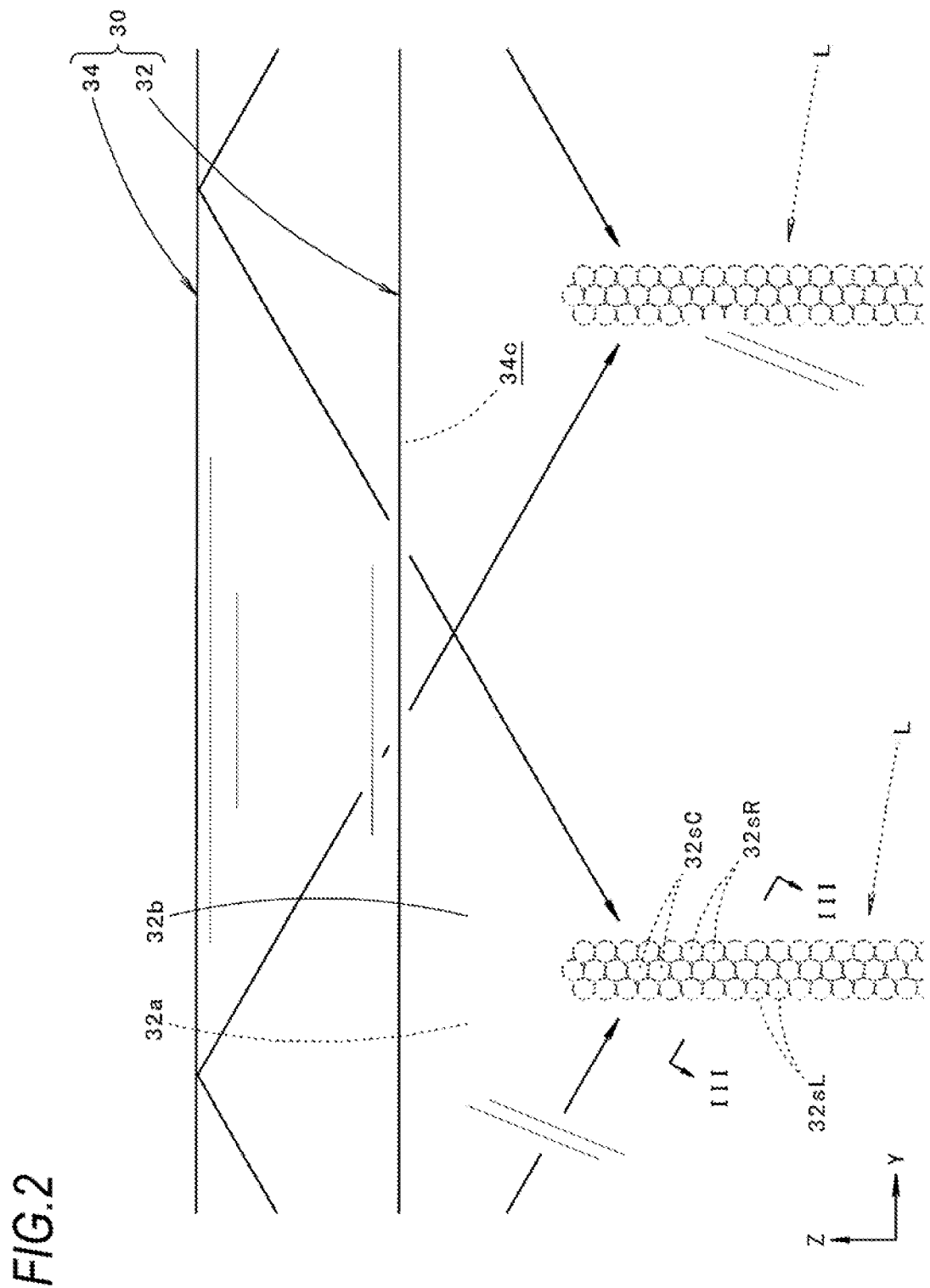
FIG. 2 is a detailed view of a portion 11 in FIG. 1.
Figure 3:
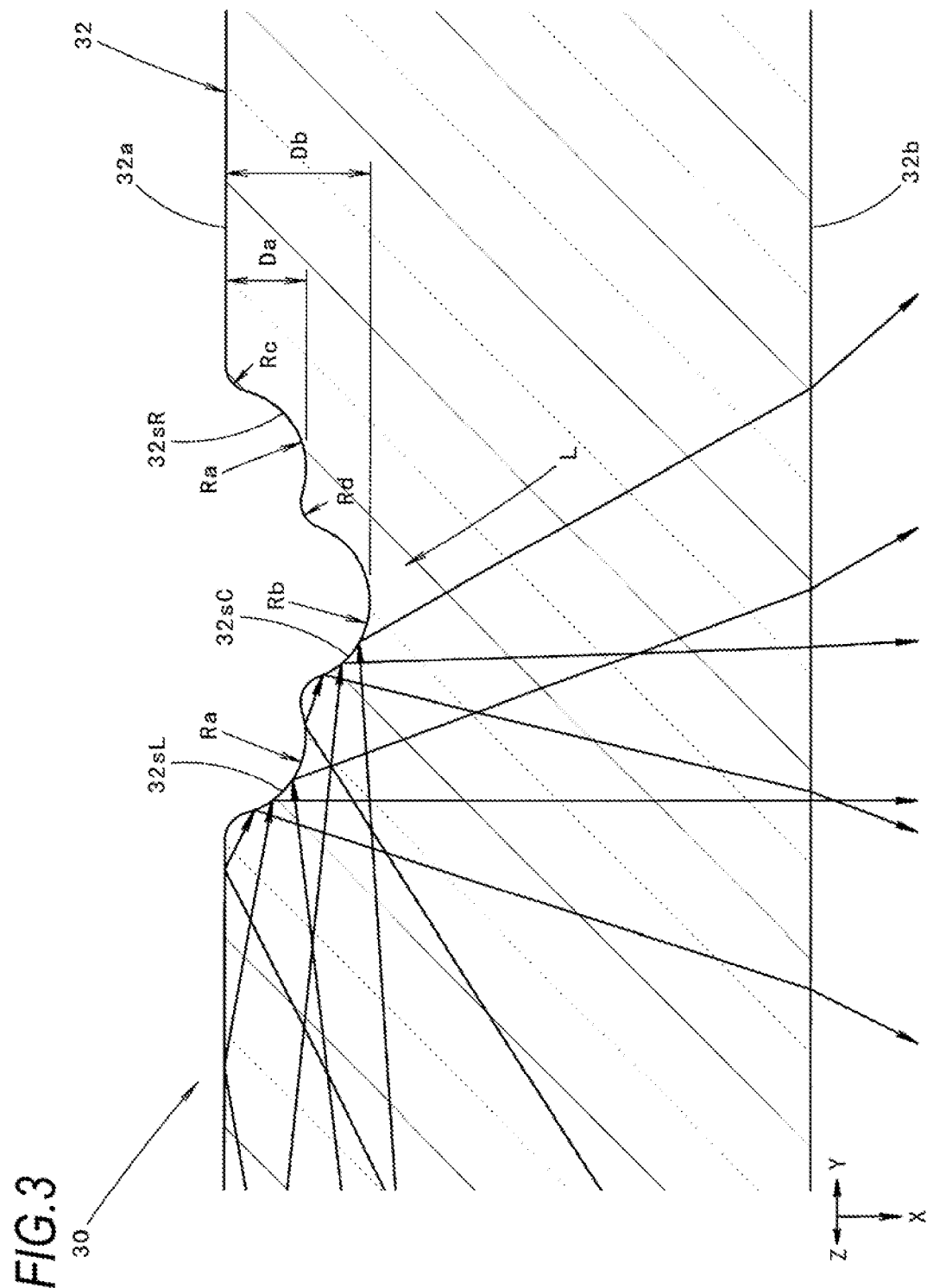
FIG. 3 is a detailed view of a cross section taken along line III-III in FIG. 2.

FIG. 1 is a front view illustrating a vehicle lamp 10 according to an embodiment of the present disclosure. FIG. 2 is a detailed view of a portion 11 in FIG. 1, and FIG. 3 is a detailed view of a cross section taken along line III-III in FIG. 2. In FIG. 1, a part of components are shown in a broken state.

In these drawings, a direction indicated by X is a "front side" of the vehicle lamp 10, a direction indicated by Y it is a "right direction", and a direction indicated h Z is an "upper direction". The direction indicated by X is a "rear side" of a vehicle, and the direction indicated by Y is also a "right direction" of the vehicle. The same applies to the other drawings.

The vehicle lamp 10 according to the present embodiment is a tail lamp that is disposed at a rear end portion of the vehicle, and has a configuration in which a lamp unit 20 is incorporated in a lamp chamber formed by a lamp body 12 and a transparent light-transmitting cover 14 attached to a front end opening of the lamp body 12.

Figure 4:
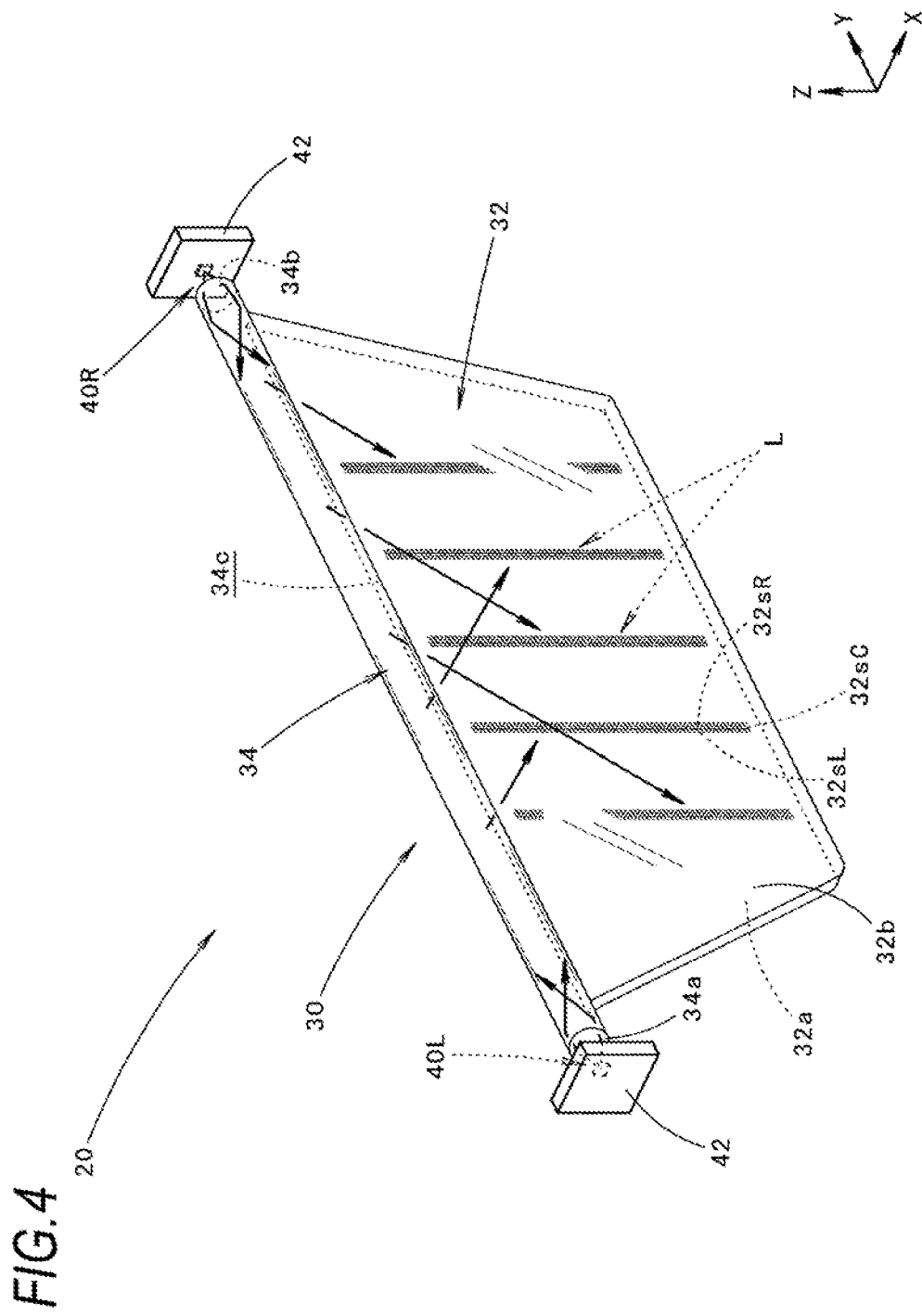
FIG. 4 is a perspective view showing main components of a lamp unit of the vehicle lamp.

FIG. 4 is a perspective view illustrating main components of the lamp unit 20.

As shown in the drawing, the lamp unit 20 includes a light-transmitting member 30 and a pair of left and right light sources 40L, 40R and has a left-right symmetric structure.

The light-transmitting member 30 is a colorless transparent resin (for example, acrylic resin) member, and has a configuration in which a plate-shaped light guide 32 extending in a flat plate shape along a vertical surface orthogonal to a front-rear direction of the lamp, and a rod-shaped light guide 34 extending in a columnar shape in a left-right direction along an upper end edge of the plate-shaped light guide 32 are formed integrally.

The plate-shaped light guide 32 has a substantially upside-down isosceles trapezoidal outer shape in a front view of the lamp, and has a plate thickness of about 1 to 3 mm (for example, a plate thickness of about 2 mm).

The rod-shaped light guide 34 has a diameter φ of about 4 to 8 mm (for example, a diameter φ of about 6 mm), and left and right end portions thereof protrude leftward and rightward of the plate-shaped light guide 32.

Thus, the light-transmitting member 30 has a configuration in which a communication portion 34c communicating with the plate-shaped light guide 32 is formed in a lower region of a peripheral surface of the rod-shaped light guide 34 so as to extend in the left-right direction.

The pair of left and right light sources 40L and 40R are red light emitting diodes and are arranged in the vicinity of left and right end surfaces 34a and 34b of the rod-shaped light guide 34.

The light source 40L on the left side is mounted on a substrate 42 in a state in which a light-emitting surface thereof faces the left end surface 34a of the rod-shaped light guide 34, and the light source 40L on the right side is mounted on a substrate 42 in a state in which a light-emitting surface thereof faces the right end surface 34b of the rod-shaped light guide 34. The pair of left and right substrates 42 are supported by the lamp body 12.

The light-transmitting member 30 is supported by the pair of left and right substrates 42 via holders 44 (see FIG. 1) mounted on left and right end portions of the rod-shaped light guide 34.

A plurality of reflective elements 32$s$C, 32$s$L, and 32$s$R are formed on a first plate surface 32$a$ located on a lamp rear side in the plate-shaped light guide 32. On the other hand, a second plate surface 32$b$ positioned on a lamp front side in the plate-shaped light guide 32 is a smooth surface.

The plurality of reflective elements 32$s$C, 32$s$L, and 32$s$R are arranged continuously along lines L extending in the upper-lower direction, and are arranged in three rows in a manner adjacent to each other in the left-right direction on the lines L.

Five lines L are arranged at equal intervals in the left-right direction, and each line L extends linearly from a position in the vicinity of an upper end edge to a position in the vicinity of a lower end edge of the first plate surface 32$a$. At this time, the plurality of reflective elements 32$s$C, 32$s$L, and 32$s$R are arranged in a state of being in close contact with each other on each line L and in a state of being displaced from each other by a half pitch in the upper-lower direction between adjacent rows.

As shown in FIG. 3, each of the reflective elements 32$s$C, 32$s$L, and 32$s$R has a concave spherical surface shape. In addition, among the plurality of reflective elements 32$s$C, 32$s$L, and 32$s$R, as compared to the reflective elements 32$s$L, 32$s$R constituting two rows on left and right sides, the reflective elements 32$s$C constituting a central row are formed at a deeper position from the first plate surface 32$a$.

Here, the deeper position from the first plate surface 32a means that, when the position of the first plate surface 32a in the absence of the concave spherical surface of each of the reflective elements 32sC, 32sL, and 32sR in FIG. 3 is set as a reference plane of the first plate surface 32a, the distance from the reference surface in the X direction in FIG. 3 is larger. In this case, a depth db of each of the reflective elements 32sC from the first plate surface 32a is set to a value of about 1.5 times to 2.5 times (for example, a value of about less than 2 times) a depth Da of each of the reflective elements 32sL, 32sR from the first plate surface 32a.

A radius Rb of the concave spherical surface constituting each of the reflective elements 32sC is set to the same value as a radius Ra of the concave spherical surface constituting each of the reflective elements 32sL, 32sR. Specifically, the radius Rb of the concave spherical surface is set to a value of about Ra, Rb=a value about R 0.1 mm to 0.5 mm (for example, a value of about R 0.3 mm).

However, in the concave spherical surface constituting each of the reflective elements 32sL, 32sR, a portion close to each reflective element 32sC is missing, and is smoothly connected to the concave spherical surface constituting each of the reflective elements 32sC via a convex curved surface having, a cross section in a convex curve shape having a radius Rd. Each of the reflective elements 32sL, 32sR is smoothly connected to the first plate surface 32a via a convex curved surface having a cross section in a convex curve shape having a radius Rc. At this time, the radii Rc, Rd of the convex curves are set to a value equal to or smaller than the radii Ra, Rb of the concave spherical surfaces (specifically, a value of R 0.1 mm≤Rc, Rd≤Ra, Rb).

As shown in FIG. 1, an interval A between the plurality of lines L in the left-right direction is set to a value larger than a width W of each line L for example, a value of about 2W to 20W.

As shown in FIG. 4, in the rod-shaped light guide 34, light from the light source 40L and incident from the left end surface 34a is totally reflected by the peripheral surface of the rod-shaped light guide 34 and guided toward the right end surface 34b, and is gradually incident on the plate-shaped light guide 32 from the communication portion 34c. The light from the light source 40R and incident from the right end surface 34b is totally reflected by the peripheral surface of the rod-shaped light guide 34 and guided toward the left end surface 34a, and is gradually incident on the plate-shaped light guide 32 from the communication portion 34c.

At this time, the light from the light source 40L and incident from the left end surface 34a of the rod-shaped light guide 34 is incident on the plate-shaped light guide 32 as light diagonally rightward and downward from the communication portion 34c, and the light from the light source 40R and incident from the right end surface 34b of the rod-shaped light guide 34 is incident on the plate-shaped light guide 32 as light diagonally leftward and downward from the communication portion 34c.

In the plate-shaped light guide 32, light from the light sources 40L and 40R and incident from the communication portion 34c of the rod-shaped light guide 34 is totally reflected by the first plate surface 32a and the second plate surface 32b, guided obliquely downward, totally reflected by the plurality of reflective elements 32sC, 32sL, and 32sR formed on the first plate surface 32a, and emitted from the second plate surface 32b toward the front side of the lamp.

At this time, since the light from the light sources 40L and 40R reaches the reflective elements 32sC, 32sL, and 32sR also from directions other than the cross section illustrated in FIG. 3, such light is totally reflected in all directions on the reflective elements 32sC, 32sL, and 32sR and emitted from the second plate surface 32b toward the front side of the lamp.

As shown in FIG. 1, the lamp chamber is provided with an extension member 16 that partially covers the light-transmitting member 30 of the lamp unit 20 in a front view of the lamp.

Specifically, the extension member 16 is configured as a panel-shaped member that covers the peripheral edge portion of the plate-shaped light guide 32 of the light-transmitting member 30, and at that time, a horizontally long rectangular opening portion 16a having a size that surrounds the five lines L is formed.

The extension member 16 is supported at an outer peripheral edge portion thereof by the lamp body 12.

Figure 5:
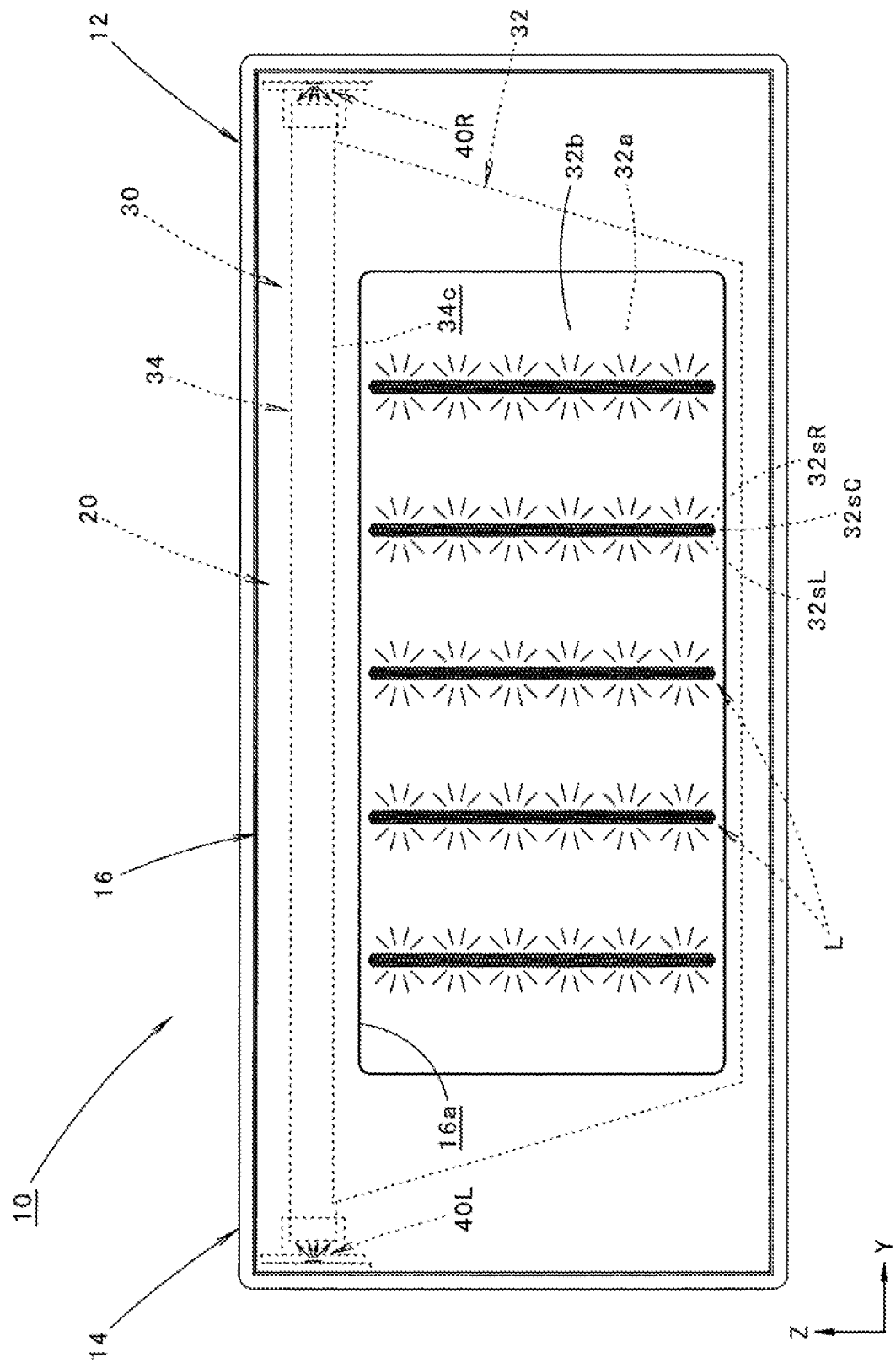
FIG. 5 is a front view showing the vehicle lamp in a turned-on state.

FIG. 5 is a front view showing the vehicle lamp 10 in a turned-on state.

As shown in the drawing, when the vehicle lamp 10 in a state in which the pair of left and right light sources 40L and 40R are turned on is observed from a front direction of the lamp (that is, from the rear side of the vehicle), the light from the light sources 40L and 40R and incident on the plate-shaped light guide 32 from the communication portion 34c via the rod-shaped light guide 34 of the light-transmitting member 30 is totally reflected by the plurality of reflective elements 32sC, 32sL, and 32sR constituting each line L, so that each line L appears to emit light in a manner substantially uniform over the entire length.

At this time, since each reflective element 32sC, 32sL, and 32sR has a substantially concave spherical surface shape, the total reflection by the reflective elements 32sC, 32sL, and 32sR is performed in a manner substantially uniform in all directions. Therefore, even when a sight direction for observing the plate-shaped light guide 32 is greatly changed, a state in which the plate-shaped light guide 32 appears to emit light linearly along each line L is maintained.

In addition, the plurality of reflective elements 32sC, 32sL, and 32sR constituting each line L are arranged in three rows, and at that time, as compared to the plurality of reflective elements 32sL, 32sR constituting two rows on the left and right sides, the plurality of reflective elements 32sC constituting the central row are formed at a deeper position from the first plate surface 32a. Therefore, the brightness of the reflected light from the reflective elements 32sC is close to the brightness of the reflected light from the reflective elements 32sL, 32sR.

Next, the effect of the present embodiment will be described.

The vehicle lamp 10 according to the present embodiment is configured to totally reflect light from the light source 40L and the light source 40R (second light source) and incident on the plate-shaped light guide 32 via the rod-shaped light guide 34 by the plurality of reflective elements 32sC, 32sL, and 32sR formed on the first plate surface 32a and then emit the light from the second plate surface 32b toward the front side of the lamp. However, since the plurality of reflective elements 32sC, 32sL, and 32sR are arranged continuously along the lines L extending in the upper-lower direction (required direction), the light from the light sources 40L, 40R and incident on the plate-shaped light guide 32 is totally reflected by the reflective elements 32sC, 32sL, and 32sR and emitted from the second plate surface 32b toward the front side of the lamp, so that the plate-shaped light guide 32 can appear to emit light linearly along the lines L.

At this time, since each reflective element 32sC, 32sL, and 32sR has a substantially concave spherical surface shape, the total reflection by the reflective elements 32sC, 32sL, and 32sR is performed in a manner substantially uniform in all directions. Therefore, even when the sight direction for observing the plate-shaped light guide 32 is greatly changed, it is possible to maintain a state in which the plate-shaped light guide 32 appears to emit light linearly along the lines L. Therefore, optical fibers can appear to emit light when the lamp is turned on (that is, when the light sources 40L, 40R are turned on), thereby improving the design property of the vehicle lamp 10.

In addition, since the plurality of reflective elements 32sC, 32sL, and 32sR are arranged in three rows on each of the lines L so as to be adjacent to each other in the direction intersecting the left-right direction (required direction), and the plate-shaped light guide 32 is configured to allow the light from the light sources 40L, 40R and incident on the plate-shaped light guide 32 to reach a position of each of the lines L from the direction obliquely leftward and upward (first direction) and the direction obliquely rightward and upward (second direction), the plate-shaped light guide 32 can appear to emit light at a brightness that is substantially uniform along the lines L.

In addition, as compared to the plurality of reflective elements 32sL, 32sR constituting the two rows on the left and right sides (the first row in the first direction and the first row in the second direction), the plurality of reflective elements 32sC constituting the central row (the second row in the first direction and the second row in the second direction) are formed at a deeper position from the first plate surface 32a. Therefore, the brightness of the reflected light from the reflective elements 32sC constituting the central row can approach the brightness of the reflected light from the reflective elements 32sL, 32sR constituting the rows on the left and right sides. Therefore, the plate-shaped light guide 32 can appear to emit light at a brightness that is even more uniform along the lines L.

As described above, according to the present embodiment, it is possible to improve the design property when the lamp is turned on in the vehicle lamp 10 including the plate-shaped light guide 32.

In the above configuration, the depth of the reflective elements 32sC constituting the central row from the first plate surface 32a is set to a value 1.5 times to 2.5 times the depth of the reflective elements 32sL, 32sR constituting the rows on the left and right sides. Therefore, the brightness of the reflected light from the reflective elements 32C constituting the central row can easily approach the brightness of the reflected light from the reflective elements 32sL, 32sR constituting the rows on the left and right sides. Thereby, the plate-shaped light guide 32 can appear to emit light at a brightness that is even more uniform along the lines L.

Further, in the present embodiment, the five lines L are arranged at an equal interval in the left-right direction. Therefore, the five optical fibers can appear to emit light in a state of being discretely arranged when the lamp is turned on, thereby further enhancing an effect of performance of the design.

At this time, in the present embodiment, the interval A between the five lines L is set to a value larger than the width W of each of the lines L. Therefore, it is possible to enhance the effect that the five optical fibers appear to emit light in a state of being discretely arranged.

The above embodiment has been described assuming that five lines L are arranged, but it is also possible to adopt a configuration in which four or less or six or more lines L are arranged.

The above embodiment has been described assuming that each line L extends linearly in the upper-lower direction, but it is also possible to adopt a configuration in which the lines extend in a direction other than the upper-lower direction, or extend in a curved shape.

The above embodiment has been described assuming that each of the reflective elements 32sC, 32sL, and 32sR has a concave spherical surface shape, but it is also possible to adopt a configuration having a substantially concave curved surface shape configured with a substantially concave spherical surface that is close to a concave spherical surface, such as a concave elliptical surface and a concave polyhedron.

The above embodiment has been described assuming that the plate-shaped light guide 32 extends in a flat plate shape along the vertical surface orthogonal to the front-rear direction of the lamp, but it is also possible to adopt a configuration in which the plate-shaped light guide 32 extends in a flat plate shape in a direction inclined with respect to the vertical surface orthogonal to the front-rear direction of the lamp, or extends along a curved surface.

The above embodiment has been described assuming that the light from the pair of left and right light sources 40L and 40K incident on the plate-shaped light guide 32 from the communication portion 34c via the rod-shaped light guide 34 of the light-transmitting member 30 is totally reflected by the plurality of reflective elements 32sC, 32sL, and 32sR formed on the first plate surface 32a, but it is also possible to adopt a configuration in which the light from the pair of left and right light sources 40L and 40R directly incident on the plate-shaped light guide 32 is totally reflected by the plurality of reflective elements 32sC, 32sL, and 32sR formed on the first plate surface 32a.

The above embodiment has been described assuming a case where the vehicle lamp 10 is a tail lamp, but in addition to the tail lamp, a configuration similar to that of the above-described embodiment can be adopted to a stop lamp, a turn signal lamp, a clearance lamp, a daytime running lamp, and the like, regardless of the place and function provided in the vehicle.

Next, modifications of the above embodiment will be described.

Figure 6:
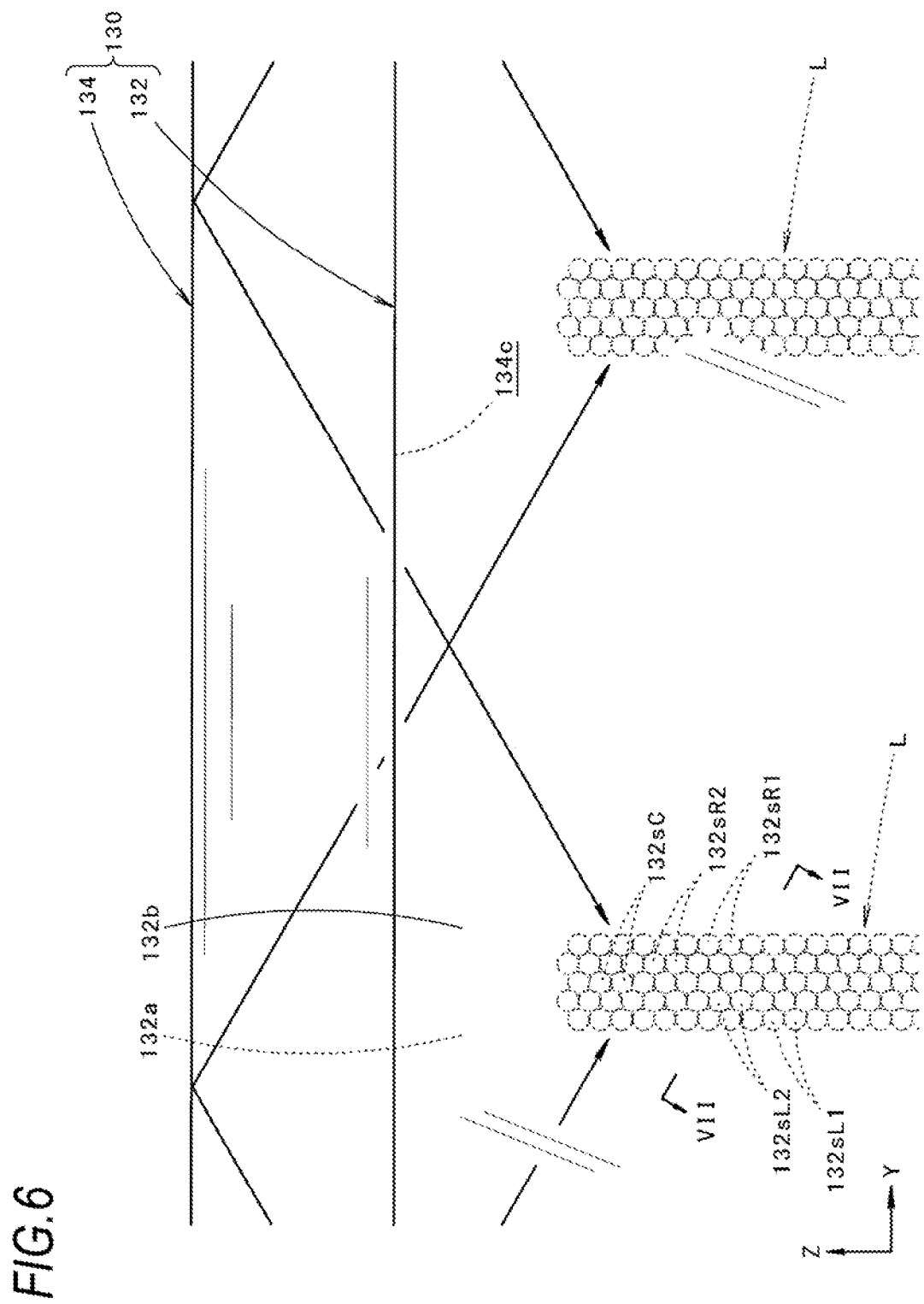
FIG. 6 is a view similar to FIG. 2, showing a first modification of the embodiment described above.
Figure 8:
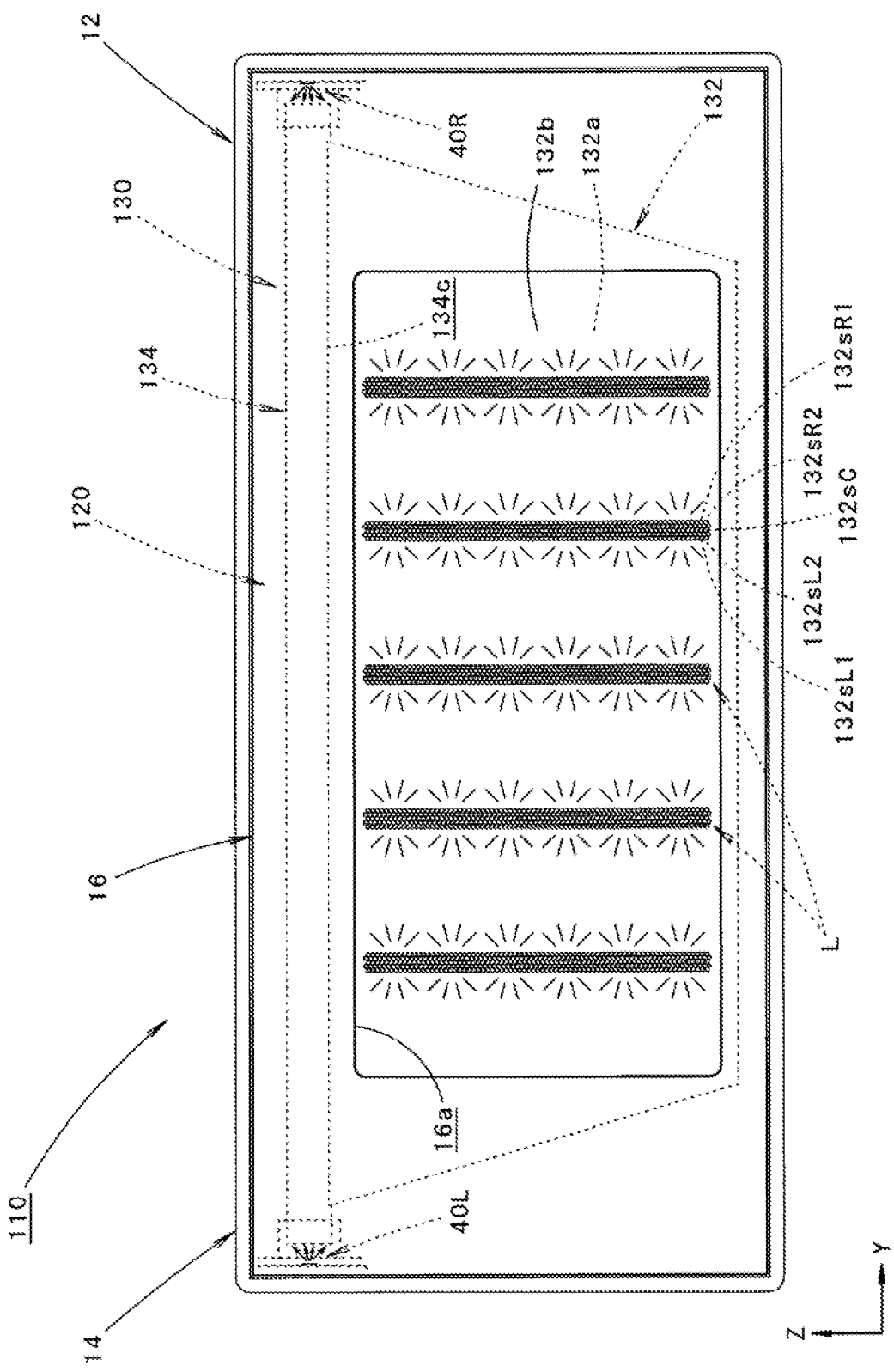
FIG. 8 is a front view showing a vehicle lamp according to the first modification in a turned-on state.

First, a first modification of the above embodiment will be described,

FIG. 6 is a view similar to FIG. 2, showing a main part of a light-transmitting member 130 in a lamp twit 120 of a vehicle lamp 110 according to the present modification (see FIG. 8).

As illustrated in FIG. 6, a basic configuration of the light-transmitting member 130 according to the present modification is the same as that of the above-described embodiment, except that a configuration of a first plate surface 132a of a plate-shaped light guide 132 is partially different from that of the above-described embodiment.

That is, on the first plate surface 132a of the plate-shaped light guide 132 of the present modification, a plurality of reflective elements 132sC, 132sL1, 132sL2, 132sR1, and 132sR2 are arranged in five rows in a state of being continuously arranged along each of the five lines L extending in the upper-lower direction. At this time, the plurality of reflective elements 132sC, 132sL1, 132sL2, 132sR1, and 132sR2 are arranged in a state of being in close contact with each other on each line L and in a state of being displaced from each other by a half pitch in the upper-lower direction between adjacent rows.

Figure 7:
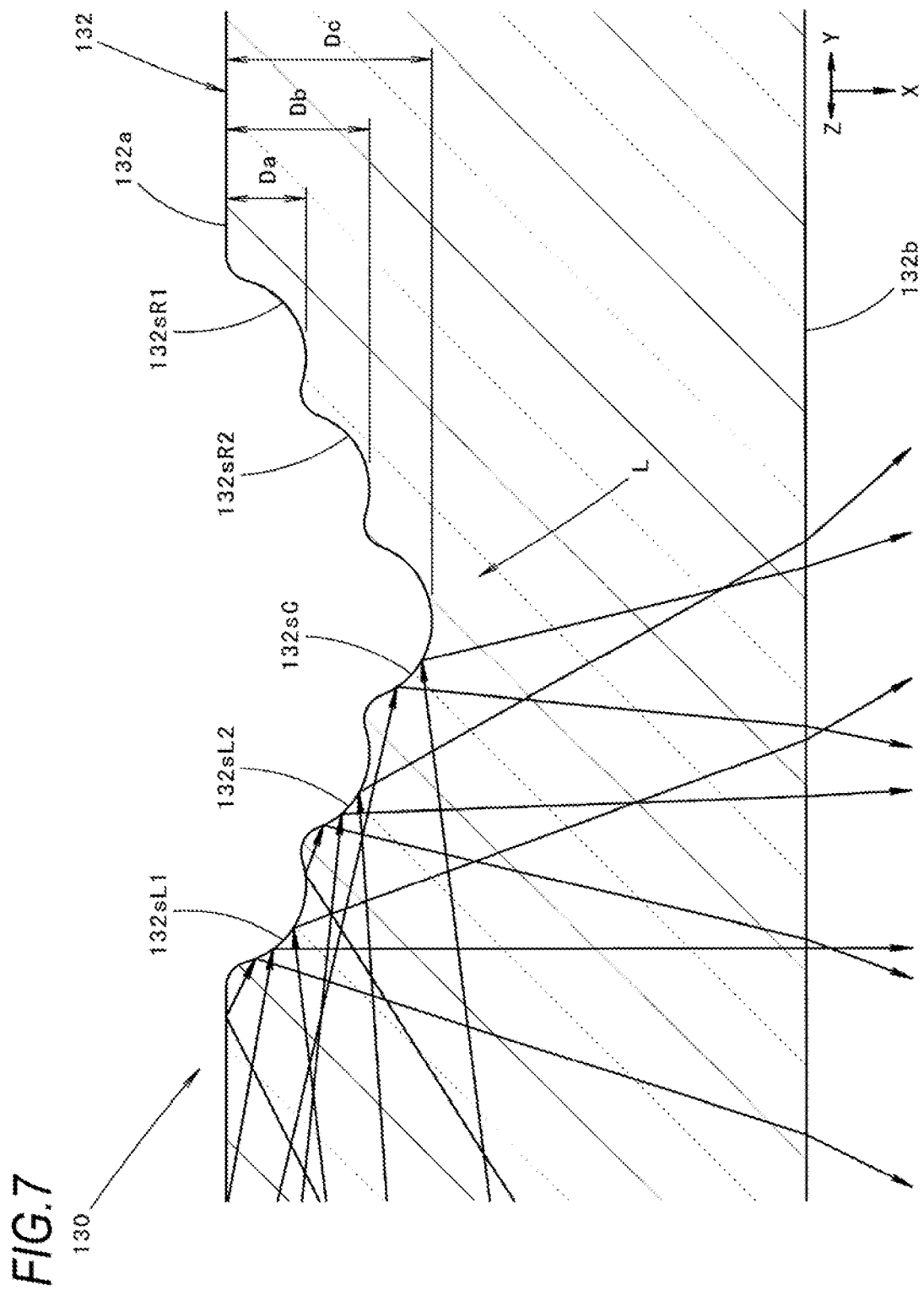
FIG. 7 is a detailed view of a cross section taken along line VII-VII in FIG. 6.

FIG. 7 is a detailed view of a cross section taken along line VII-VII in FIG. 6.

As shown in FIG. 7, each of the reflective elements 132sC, 132sL1, 132sL2, 132sR1, 132sR2 has a concave spherical surface shape. The reflective elements 132sC constituting a central row (third row) are formed at a position deeper than the reflective elements 132sL2 and 132sR2 constituting rows on the left and right sides thereof (second row in the first direction and second row in the second direction). The reflective elements 132sL2 and 132sR2 are formed at a position deeper than the reflective elements 132sL1, and 132sR1 constituting rows on the left and right sides thereof (first row in the first direction and first row in the second direction).

At this time, the reflective elements 132sC have the same shape as the reflective elements 32sC of the above-described embodiment. The reflective elements 132sL1 and 132sL2 have the same shape as the reflective elements 32sL of the above-described embodiment. The reflective elements 132sR1 and 132sR2 have the same shape as the reflective elements 32sR of the above-described embodiment.

Further, a concave spherical surface constituting each of the reflective elements 132sL2 and 132sR2 is smoothly connected to the concave spherical surface constituting each of the reflective elements 132sC via a convex curved surface. A concave spherical surface constituting, each of the reflective elements 132sL1 and 132sR1 is smoothly connected to the concave spherical surface constituting each of the reflective elements 132sL2 and 132sR2 via a convex curved surface, and is smoothly connected to the first plate surface 132a via a convex curved surface.

As a result, a depth db of each of the reflective elements 132sL2, 132sR2 from the first plate surface 132a is set to a value of about 1.5 times to 2.5 times (for example, a value of about less than 2 times) a depth Da of each of the reflective elements 132sL1, 132sR1 from the first plate surface 132a. A depth Dc of each of the reflective elements 132sC from the first plate surface 132a is set to a value of about 2 times to 3 times (for example, a value of about 2.5 times) the depth Da.

In the plate-shaped light guide 132, light from the light sources 40L and 40R and incident from a communication portion 134c of the rod-shaped light guide 134 (see FIG. 8) is guided obliquely downward, totally reflected by the plurality of reflective elements 132sC, 132sL1, 132sL2, 132sR1, and 132sR2 formed on the first plate surface 132a, and emitted from a second plate surface 132b toward the front side of the lamp.

FIG. 8 is a front view showing the vehicle lamp 110 in a turned-on state.

As shown in FIG. 8, when the vehicle lamp 110 in a state in which the pair of left and right light sources 40L and 40R are turned on is observed from the front direction of the lamp, the light from the light sources 40L and 40R and incident on the plate-shaped light guide 132 torn the communication portion 134c to the rod-shaped light guide 134 of the light-transmitting member 130 is totally reflected by the plurality of reflective elements 132sC, 132sL1, 132sL2, 132sR1, and 132sR2 constituting each line L, so that each line L appears to emit light in a manner substantially uniform over the entire length.

At this time, since each reflective element 132sC, 132sL1, 132sL2, 132sR1, and 132sR2 has a substantially concave spherical surface shape, the total reflection by the reflective elements 132sC, 132sL1, 132sL2, 132sR1 and 132sR2 is performed in a manner substantially uniform in all directions. Therefore, even when a sight direction for observing the plate-shaped light guide 132 is greatly changed, a state in which the plate-shaped light guide 132 appears to emit light linearly along each line L is maintained.

Further, since those constituting an inner row among the plurality of reflective elements 132sC, 132sL1, 132sL2, 132sR1, 132sR2 constituting each line L are formed at a position deeper from the first plate surface 132a, the brightness of the reflected light from the reflective elements 132sC, 132sL1, 132sL2, 132sR1, 132sR2 are substantially uniform.

As described above, in the present modification, in each of the five lines L, the plurality of reflective elements 132sC, 132sL1, 132sL2, 132sR1, and 132sR2 can appear to emit light in a manner substantially uniform over the five lines. As a result, the plate-shaped light guide 132 can appear to emit light in a wider width along each line L than in the case of the above embodiment.

By reducing a size of each of the reflective elements 132sC, 132sL1, 132sL2, 132sR1, and 132sR2, each line L can be set the same width as the line L of the above-described embodiment. In this case, the plate-shaped light guide 132 can appear to emit light along each line L in a manner more uniform than in the case of the above embodiment.

Next, a second modification of the above embodiment will be described.

Figure 9:
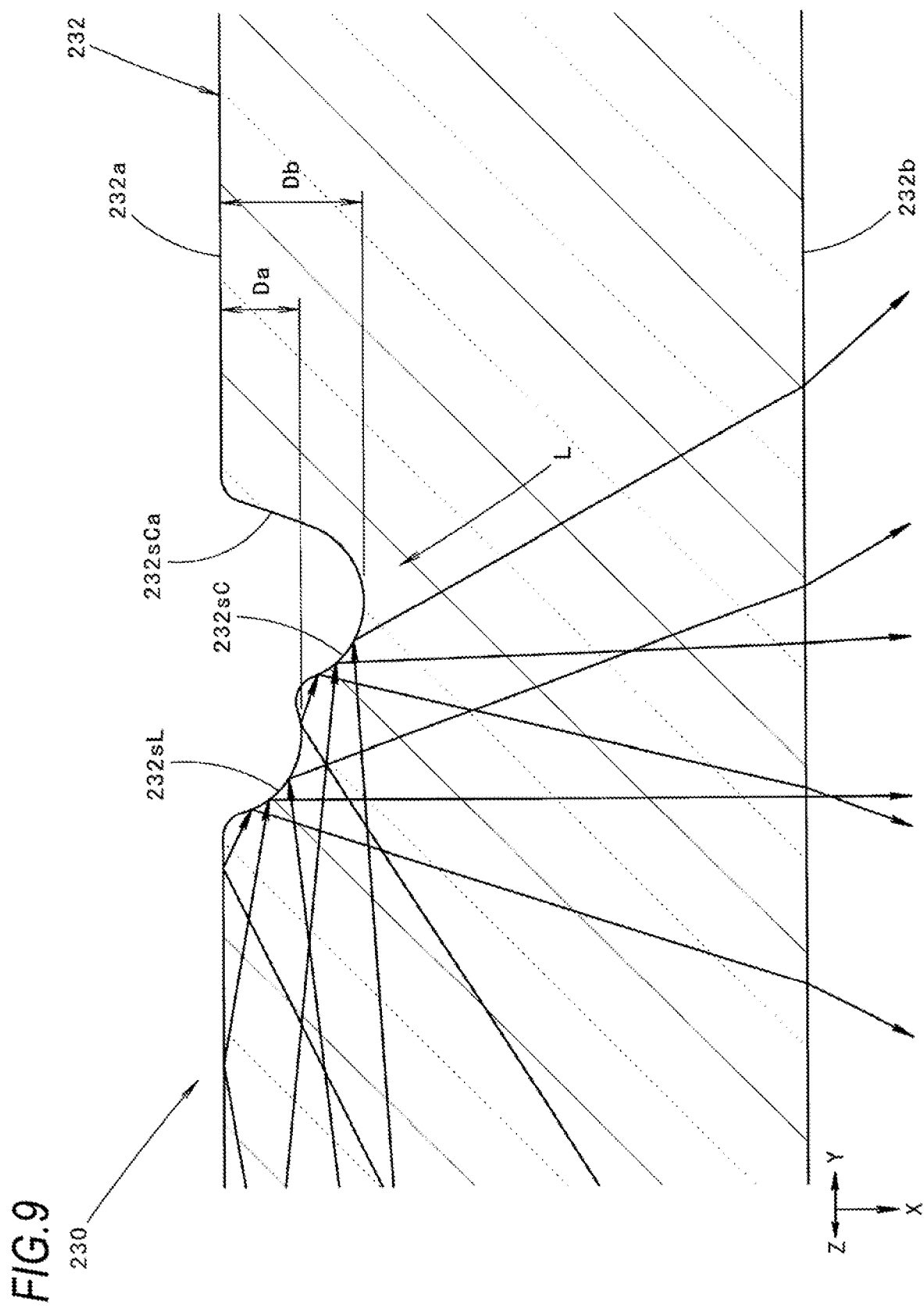
FIG. 9 is a view similar to FIG. 3, showing a second modification of the embodiment described above.

FIG. 9 is a view similar to FIG. 3, showing a main part of a light-transmitting member 230 in a lamp unit of a vehicle lamp according to the present modification.

As illustrated in FIG. 9, a basic configuration of the light-transmitting member 230 according to the present modification is the same as that of the above-described embodiment, except that a configuration of a first plate surface 232a of a plate-shaped light guide 232 is partially different from that of the above-described embodiment, and that the light of the light sources is incident only from a left end surface of a rod-shaped light guide (not illustrated).

That is, on the first plate surface 232a of the plate-shaped light guide 232 of the present modification, a plurality of reflective elements 232sC and 232sL are arranged in two rows in a state of being continuously arranged along each of the five lines L extending in the upper-lower direction. At this time, the plurality of reflective elements 232sC, 232sL are arranged in a state of being in close contact with each other on each line L and in a state of being displaced from each other by a half pitch in the upper-lower direction between the two rows.

Each of the reflective elements 232sC and 232sL has the same surface shape as each of the reflective elements 32sC and 32sL of the above-described embodiment. The reflective elements 232sC constituting a right row (second row in the first direction) is formed at a position deeper from the first plate surface 232a than the reflective elements 232sL constituting a left row (first row in the first direction). A right side portion of each reflective element 232sC is smoothly connected to the first plate surface 232a via an inclined portion 232sCa.

In this case, also in the present modification, a depth db of each of the reflective elements 232sC from the first plate surface 232a is set to a value of about 1.5 times to 2.5 times (for example, a value of about less than 2 times) a depth Da of each of the reflective elements 232sL from the first plate surface 232a.

In the plate-shaped light guide 232, light from a light source on the left side (not shown) and incident from a communication portion of the rod-shaped light guide (not shown) is guided obliquely rightward and downward, totally reflected by the plurality of reflective elements 232sC, 232sL, formed on the first plate surface 232a, and emitted from the second plate surface 232b toward the front side of the lamp.

Also in a case where the configuration of the present modification is adopted, in each of the five lines L, the plurality of reflective elements 232sC, 232sL can appear to emit light in a manner substantially uniform over the two lines.

Next, a third modification of the above embodiment will be described.

Figure 10:
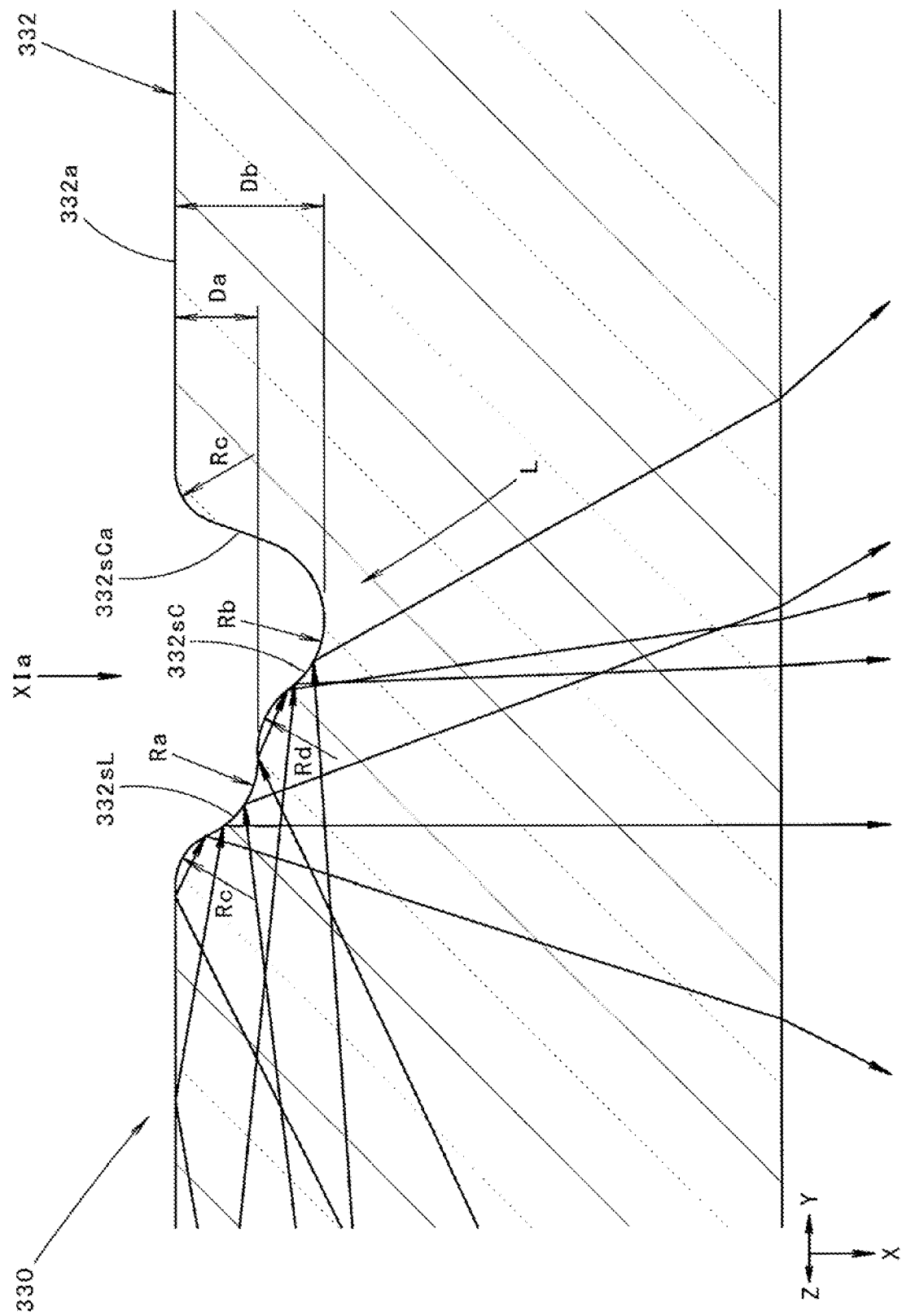
FIG. 10 is a view similar to FIG. 9, showing a third modification of the embodiment described above.

FIG. 10 is a view similar to FIG. 9, showing a main part of a light-transmitting member 330 in a lamp unit of a vehicle lamp according to the present modification.

As illustrated in FIG. 10, a basic configuration of the light-transmitting member 330 according to the present modification is the same as that of the second modification, except that a shape of an outer peripheral edge portion of each of reflective elements 332sC and 332sL formed on the first plate surface 332a of the plate-shaped light guide 332 is different from that in the second modification.

That is, in the present modification, a cross-sectional shape of a convex curved surface smoothly connecting each reflective element 332sL and each reflective element 332sC is formed by a convex curve having a radius Rd having the same value as the radius Ra, Rb of the concave spherical surface constituting each of the reflective elements 332sL, 332sC (specifically, Rd=Ra=Rb=R 0.3 mm).

Also in the present modification, each of the reflective elements 332sL is smoothly connected to the first plate surface 332a via a convex curved surface, and a cross-sectional shape of the convex curved surface is formed by a convex curve having a radius Rc having the same value as the radius Ra of the concave spherical surface constituting each of the reflective elements 332sL (that is, Rc=R 0.3 mm).

Also in the present modification, each of the reflective elements 332sC is smoothly connected to the first plate surface 332a via an inclined portion 332sCa, and a convex curved surface connecting the inclined portion 332sCa and the first plate surface 332a has a cross-sectional shape of a convex curve having a radius Rc having the same value as the radius Rb of the concave spherical surface constituting each of the reflective elements 332sC.

FIG. 11A is a view taken along an XIa direction of FIG. 10, and FIG. 12A is a cross-sectional view taken along a line XIIa-XIIa of FIG. 11.

As illustrated in FIG. 11A, a pitch P2 between the plurality of reflective elements 332sL is set to a value 2 times a radius Ra of the concave spherical surface constituting each of the reflective elements 332sL. As shown in FIG. 12A, the reflective elements 332sL adjacent to each other are smoothly connected via a connection portion 332c having a convex curved surface shape.

A cross-sectional shape of the convex curved surface constituting the connection portion 332c (specifically, a cross-sectional shape along the direction in which the line L extends) is formed by a convex curve having a radius Re having the same value as the radius Ra of the concave spherical surface constituting each of the reflective elements 332sL (that is, Re=R 0.3 mm).

If such a convex curved connection portion 332c is not formed, the connection portion has a pointed shape indicated by a two-dot chain line in FIG. 12A.

The same applies to the plurality of reflective elements 332sC.

Also in a case where the configuration of the present modification is adopted, in each of the five lines L, the plurality of reflective elements 332sC, 332sL can appear to emit light in a manner substantially uniform over the two lines.

In addition, in the present modification example, the pitch P2 between the plurality of reflective elements 332sL is set to a value twice the radius Ra of the concave spherical surface constituting each of the reflective elements 332sL, the reflective elements 332sL adjacent to each other are smoothly connected via the connection portion 332c having a convex curved surface shape, and the cross-sectional shape thereof is formed by the convex curve having the radius Re which is the same value as the radius Ra of the concave spherical surface constituting each of the reflective elements 332sL. Therefore, the following effect can be acquired.

That is, it is possible to easily perform mold processing of the connection portion 332c while maintaining the same degree of accuracy as mold processing of the reflective elements 332sL. In addition, it is possible to prevent a maximum inclination angle of an outer peripheral edge portion of each of the reflective elements 332sL from becoming extremely small by a mold processing curved surface formed on the connection portion 332c, and thus it is possible to prevent the brightness of the reflected light from the reflective elements 332sL from being lowered.

The same applies to the plurality of reflective elements 332sC.

Next, a fourth modification of the above-described embodiment will be described.

FIG. 11B and FIG. 12B are views similar to FIG. 11A and FIG. 12A, showing main parts of a plate-shaped light guide 432 according to the present modification.

As illustrated in FIG. 11B and FIG. 12B, a basic configuration of the plate-shaped light guide 432 according to the present modification is the same as that of the third modification, but is different from the case of the third modification in that a pitch P2 between a plurality of reflective elements 432sL formed on a first plate surface 432a is set to a value of about 2.7 times a radius Ra of a concave spherical surface constituting each of the reflective elements 432sL.

Also in the present modification, the plurality of reflective elements 432sL are such that the reflective elements 432sL adjacent to each other are smoothly connected via a connection portion 432c having a convex curved surface shape, and the cross-sectional shape thereof is formed by a convex curve having the radius Re which is the same as the radius Ra of the concave spherical surface constituting each of the reflective elements 432sL.

The same applies to the plurality of reflective elements 432sC.

Also in the present modification, as shown in FIG. 118, the reflective elements 432sL and the reflective elements 432sC are alternately in close contact with each other along each line L, and therefore, a pitch P1 in the direction orthogonal to the direction in which the line L extends is smaller than that in the third modification.

Also in a case where the configuration of the present modification is adopted, in each of the five lines L, the plurality of reflective elements 432sC, 432sL can appear to emit light in a manner substantially uniform over the two lines, and it is possible to easily perform mold processing of the connection portion 432c while maintaining the same degree of accuracy as mold processing of the reflective elements 432sL.

Moreover, in the present modification, since the pitch P2 between the reflective elements 432sL is set to a value of about 2.7 times the radius Ra of the concave spherical surface constituting each of the reflective elements 432sL, a maxim urn inclination angle of an outer peripheral edge portion can be prevented from becoming so small due to mold processing curved surfaces of the connection portions 432sL. Thus it is easy to prevent brightness of reflected light from the reflective elements 432sL from being lowered.

The same applies to the plurality of reflective elements 432sC.

Next, a fifth modification of the above-described embodiment will be described,

FIG. 11C and FIG. 12C are views similar to FIG. 11A and FIG. 12A, showing main parts of a plate-shaped light guide 532 according to the present modification.

As illustrated in FIG. 11C and FIG. 12C, a basic configuration of the plate-shaped light guide 532 according to the present modification is the same as that of the third modification, but is different from the case of the third modification in that a pitch P2 between a plurality of reflective elements 532sL, formed on a first plate surface 532a is set to a value of about 3.3 times a radius Ra of a concave spherical surface constituting each of the reflective elements 532sL.

Also in the present modification, the plurality of reflective elements 532sL are such that the reflective elements 532sL adjacent to each other are smoothly connected via a connection portion 532c having a convex curved surface shape, and the cross-sectional shape thereof is formed by a convex curve having the radius Re which is the same as the radius Ra of the concave spherical surface constituting each of the reflective elements 532sL.

The same applies to the plurality of reflective elements 532sC.

Also in the present modification, as shown in FIG. 11C, the reflective elements 532sL and the reflective elements 532sC are alternately in close contact with each other along each line L, and therefore, a pitch P1 in the direction orthogonal to the direction in which the line L extends is further smaller than that in the fourth modification.

Also in a case where the configuration of the present modification is adopted, in each of the five lines L, the plurality of reflective elements 532sC, 532sL can appear to emit light in a manner substantially uniform over the two lines. Moreover, it is possible to easily perform mold processing of the connection portion 532c while maintaining the same degree of accuracy as mold processing of the reflective elements 532sL.

Moreover, in the present modification, since the pitch P2 between the reflective elements 532sL is set to a value of about 3.3 times the radius Ra of the concave spherical surface constituting each of the reflective elements 532sL, a maximum inclination angle of an outer peripheral edge portion can be effectively prevented from becoming so small due to mold processing curved surfaces of the connection portions 532sL. Thus, it is easier to prevent brightness of reflected light from the reflective elements 532sL from being lowered.

The same applies to the plurality of reflective elements 532sC.

Next, a sixth modification of the above-described embodiment will be described.

FIG. 11D and FIG. 12D are views similar to FIG. 11A and FIG. 12A, showing main parts of a plate-shaped light guide 632 according to the present modification.

As illustrated in FIG. 11D and FIG. 12D, a basic configuration of the plate-shaped light guide 632 according to the present modification is the same as that of the third modification, but is different from the case of the third modification in that a pitch P2 between a plurality of reflective elements 632sL formed on a first plate surface 632a is set to a value of about 3.5 times a radius Ra of a concave spherical surface constituting each of the reflective elements 632sL.

Also in the present modification, the plurality of reflective elements 632sL are such that the reflective elements 632sL adjacent to each other are smoothly connected via a connection portion 632c having a convex curved surface shape, and the cross-sectional shape thereof is formed by a convex curve having the radius Re which is the same as the radius Ra of the concave spherical surface constituting each of the reflective elements 632sL.

The same applies to the plurality of reflective elements 632sC.

Also in the present modification, as shown in FIG. 11D, the reflective elements 632sL and the reflective elements 632sC are alternately in close contact with each other along each line L, and therefore, a pitch P1 in the direction orthogonal to the direction in which the line L extends is further smaller than that in the fifth modification.

Also in a case where the configuration of the present modification is adopted, in each of the five lines L, the plurality of reflective elements 632sC, 632sL can appear to emit light in a manner substantially uniform over the two lines, and it is possible to easily perform mold processing of the connection portion 632c while maintaining the same degree of accuracy as mold processing of the reflective elements 632sL.

Moreover, in the present modification, since the pitch P2 between the reflective elements 632sL is set to a value of about 3.5 times the radius Ra of the concave spherical surface constituting each of the reflective elements 632sL, a maximum inclination angle of an outer peripheral edge portion can be extremely prevented from becoming so small due to mold processing curved surfaces of the connection portions 632sL. Thus, it is easier to prevent brightness of reflected light from the reflective elements 632sL from being lowered.

On the other hand, when the pitch P2 between the plurality of reflective elements 632sL is larger than in the case of the present modification, a flat surface portion in which the connection portion 632c having a convex curved surface shape is interrupted is formed on the first plate surface 632a shown by a two-dot chain line in FIG. 12D. As a result, an arrangement density of the plurality of reflective elements 632sC, 632sL arranged in two rows as an entity of the plurality of rows is reduced, and therefore, the effect of performance in the design that appears to emit light linearly along the line is reduced.

Therefore, it is preferable that the pitch P2 between the plurality of reflective elements 632sL is set to a value equal to or smaller than 3.5 times the radius Ra of the concave spherical surface constituting each of the reflective elements 632sL. At this time, a configuration set to a value of 2.5 times to 3 times is preferable.

The same applies to the plurality of reflective elements 632sC.

Incidentally, numerical values shown as the specifications in the above embodiment and the modifications thereof are merely examples, and these may be set to different values as appropriate.

In addition, the present disclosure is not limited to the configurations described in the above-described embodiment and modifications thereof, and a configuration in which various other modifications are added can be adopted.

This application is based on Japanese Patent Application No. 2018-207300 filed on Nov. 2, 2018 and Japanese Patent Application No. 2019-46966 filed on Mar. 14, 2019, the contents of which are incorporated herein by reference.

The invention claimed is:

1. A vehicle lamp comprising:
a light source; and
a plate-shaped light guide including a first plate surface on which a plurality of reflective elements are formed and a second plate surface, wherein
the plate-shaped light guide is configured to totally reflect light from the light source and incident on the plate-shaped light guide by the plurality of reflective elements and then emit the light from the second plate surface toward a front side of the lamp,
the plurality of reflective elements are arranged in a state of being continuously arranged along a line extending in a required direction, and are arranged in a plurality of rows on the line so as to be adjacent to each other in a direction intersecting the required direction,
the plate-shaped light guide is configured to allow the light from the light source and incident on the plate-shaped light guide to reach a position of the line from a first direction intersecting the required direction, and
each of the reflective elements has a substantially concave curved surface shape, and as compared to reflective elements constituting a first row in the first direction that is closest to the first direction among the plurality of rows, reflective elements constituting a second row in the first direction that is adjacent to the first row in the first direction is formed at a deeper position from the first plate surface.

2. The vehicle lamp according to claim 1, wherein
a depth of the reflective elements constituting the second row in the first direction from the first plate surface is set to a value 1.5 times to 2.5 times a depth of the reflective elements constituting the first row in the first direction from the first plate surface.

3. The vehicle lamp according to claim 1, further comprising:
a second light source disposed to allow light to reach the plate-shaped light guide at the position of the line from a second direction that is a direction intersecting the required direction and is opposite to the first direction,
wherein as compared to reflective elements constituting a first row in the second direction that is closest to the second direction among the plurality of rows, reflective elements constituting a second row in the second direction that is adjacent to the first row in the second direction is formed at a deeper position from the first plate surface.

4. The vehicle lamp according to claim 3, wherein
the second row in the first direction and the second row in the second direction are the same row.

5. The vehicle lamp according to claim 3, wherein
a third row is disposed between the second row in the first direction and the second row in the second direction, and
as compared to the reflective elements constituting the second row in the first direction and the reflective elements constituting the second row in the second direction, reflective elements constituting the third row are formed at a deeper position from the first plate surface.

6. The vehicle lamp according to claim 1, wherein
the line includes a plurality of lines arranged at an interval in a direction intersecting the required direction.

7. The vehicle lamp according to claim 1, wherein
a surface shape of each of the reflective elements is set to a concave spherical surface shape, and
a pitch between a plurality of reflective elements constituting each of the rows is set to a value of 2 to 3.5 times a radius of the concave spherical surface constituting each of the reflective elements.

* * * * *